W. ELLIOTT.
VENTILATED GRANARY.
APPLICATION FILED MAR. 3, 1914.
1,119,941.
Patented Dec. 8, 1914.
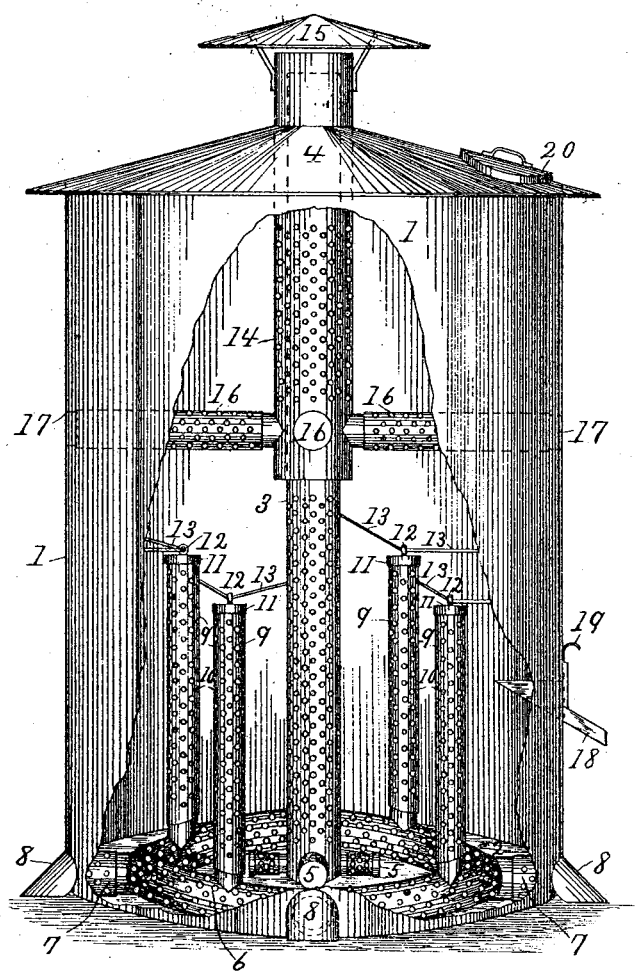
Witnesses.
J. U. Cole
C. B. Dorchester.
Inventor.
William Elliott.
G. P. Diederick.
By
Attorney

UNITED STATES PATENT OFFICE.

WILLIAM ELLIOTT, OF SHERMAN, TEXAS.

VENTILATED GRANARY.

1,119,941. Specification of Letters Patent. Patented Dec. 8, 1914.

Application filed March 3, 1914. Serial No. 822,185.

*To all whom it may concern:*

Be it known that I, WILLIAM ELLIOTT, a citizen of the United States, residing at Sherman, in the county of Grayson and State of Texas, have invented certain new and useful Improvements in Ventilated Granaries, of which the following is a specification.

This invention relates to ventilating devices for granaries, and it has for its object to provide a simple and efficient device of the character described for expelling the heat which arises from damp grain when stored.

A further object of the invention is to produce a device with tubular members having ventilating openings and connected or arranged in such manner that when grain is stored around the same they will act as air ducts, permitting of thorough ventilation of the interior, thus enabling grain not thoroughly dry to be cured quickly and in a superior manner and also avoiding the heating of the interior which frequently results in deterioration of the grain.

A still further object of the invention is to so construct ducts or chambers for air-passages in granaries that they can not fill or clog with grain, and the air be thus obstructed, and also to arrange them in the granary as to secure the most perfect ventilation of the whole mass by gaining a free circulation of pure air, and facilitating the escape of the heated air and noxious gases to which all grain is subject, the whole being easily and cheaply made, vermin proof durable in its character, and removable at pleasure.

In the drawing there is disclosed a certain structure of apparatus, but in practical fields this structure may necessitate alterations, to which the patentee is entitled, provided the alterations are comprehended within the scope of what is claimed.

The invention comprises further features and combinations as hereinafter set forth, shown in the drawing and claimed.

In the accompanying drawing, the view is a side elevation of a structure embodying my invention, the wall of which is partly broken away for better illustration of the interior.

Referring to the drawing, 1, represents the outer shell of a granary in the ordinary cylindrical form which is simple and cheap in construction, but it may have a quadrangular outline as preferred. The general form thereof is not the gist of this invention as either is adapted to the mode of interior arrangement herein described.

2 represents the floor or base of the structure, 3 a perforated tubular flue or stand pipe placed vertically at or near the center and extending through roof 4 of the same where it opens to the atmosphere. Radiating from the bottom of this tube and opening into it are provided short horizontal perforated tubes 5.

Resting upon the bottom 2 is shown a circular perforated air tube or flue 6, but it may be of hexagon or octagon form, it is of smaller diameter than the shell 1, and provided with four or more lateral perforated tubes 7 opening into and diverging or radiating therefrom. they are also open through the shell 1, and communicate with the outside atmosphere through these mediums; these latter openings being screened to prevent the entrance of mice or rats; and to guard against the access of rain to the grain in the case of granaries exposed to the elements. hoods 8 are provided. Suitably mounted and spaced apart upon said circular tube 6, are four or more vertical tubes 9 of any desired length and provided throughout the length thereof with numerous apertures 10, each tube carries a removable cap 11 provided with an eye 12 with which are connected brace rods 13, that are pivotally connected at convenient points to the inner side of the shell 1. these rods serve the purpose of supporting the vertical tubes in an upright position, and these tubes serve to carry off the heated air at the sides of the granary. I have shown but four, but in practical operation there should be others in proportion to the size of the granary, and likewise in large granaries more than one circular tube 6 would be necessary. Surrounding the tube 3, and of about half its length is a larger perforated tube 14 extending through and supported by the roof 4 of the granary, where it is provided with a protecting cap 15; near the lower end of this tube, radially disposed and opening into it, are four or more perforated horizontal tubes 16, that extend to the inner shell of the granary and are there supported by sleeves 17 attached thereto.

18 is a chute through which the grain is drawn out of the granary, 19 is a gate for closing it, and 20 represents an ordinary man-hole.

It will be seen that by this arrangement of parts a very general ventilation is given to the entire body of grain by the ducts radiating in different directions, and in connection with the outer holes; the main central vertical tubes acting as exit flues that create more or less draft. By this means the natural tendency of the damp or heated air in the grain is diverted into and through these channels and escapes, the operation being accelerated should the grain be in a heated state. There are other details that could be mentioned but as they pertain mostly to ordinary storage bins it is not deemed necessary.

What I esteem as new and desire to secure by Letters Patent, is—

A device of the class described comprising the combination with a granary, of a circular perforated tube resting upon the bottom of the same, lateral perforated tubes opening into and radiating therefrom, vertical perforated flues extending from the circular tube to about one half the height of the granary, a vertical flue centrally positioned in said granary and extending to and through the roof, the lower half of said flue being perforated, an auxiliary perforated flue positioned around the unperforated portion of said vertical flue and extending through the roof, radially disposed tubes extending from the lower end of said flue and communicating therewith, as set forth.

In testimony whereof I affix my signature in presence of two witnesses.

WILLIAM ELLIOTT.

Witnesses:
  T. W. COLE,
  C. B. DORCHESTER.